F. T. FLINCHBAUGH.
GOVERNOR MECHANISM FOR INTERNAL COMBUSTION ENGINES.
APPLICATION FILED NOV. 30, 1909.
966,896. Patented Aug. 9, 1910.
3 SHEETS—SHEET 1.
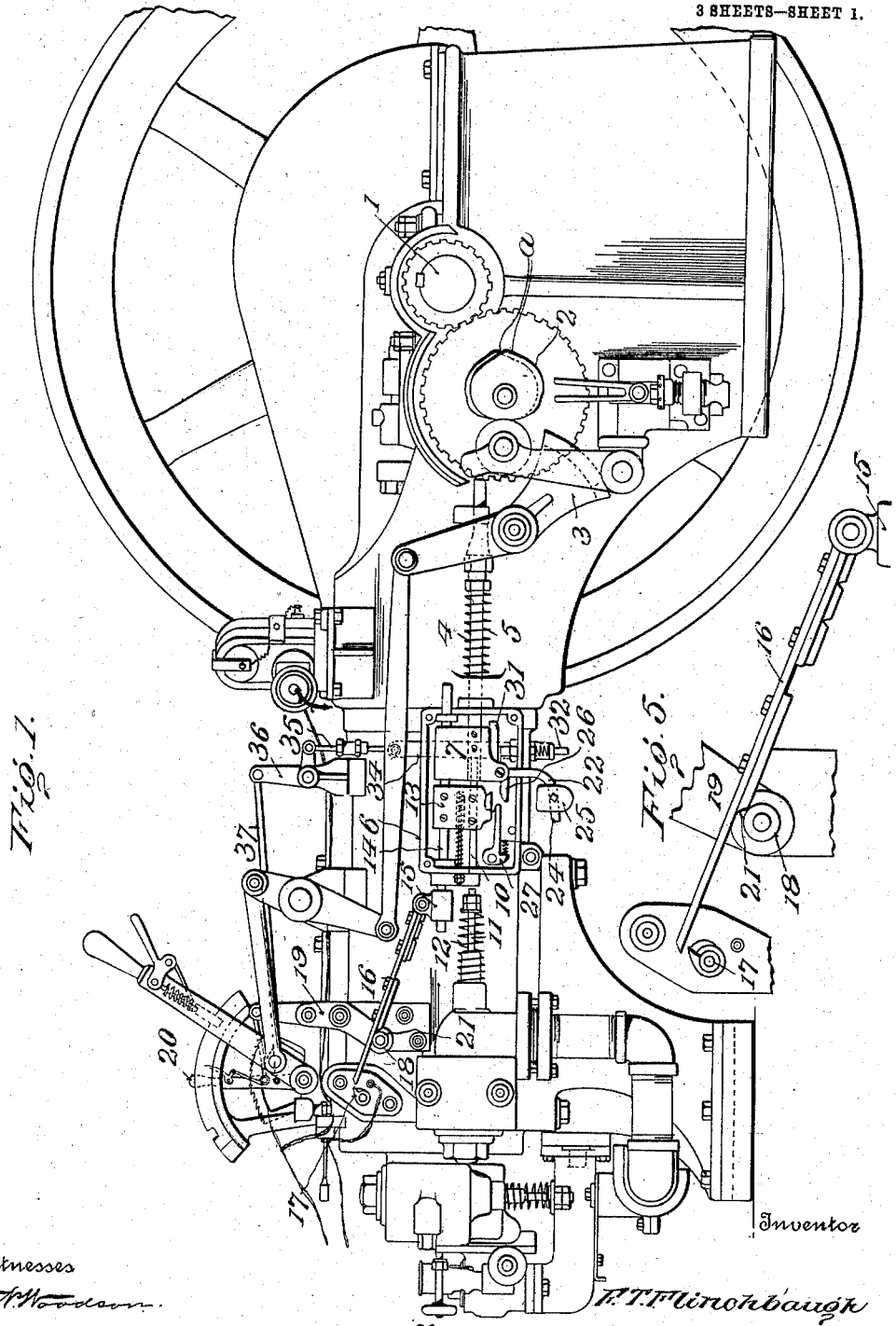

F. T. FLINCHBAUGH.
GOVERNOR MECHANISM FOR INTERNAL COMBUSTION ENGINES.
APPLICATION FILED NOV. 30, 1909.
966,896.
Patented Aug. 9, 1910.
3 SHEETS—SHEET 2.
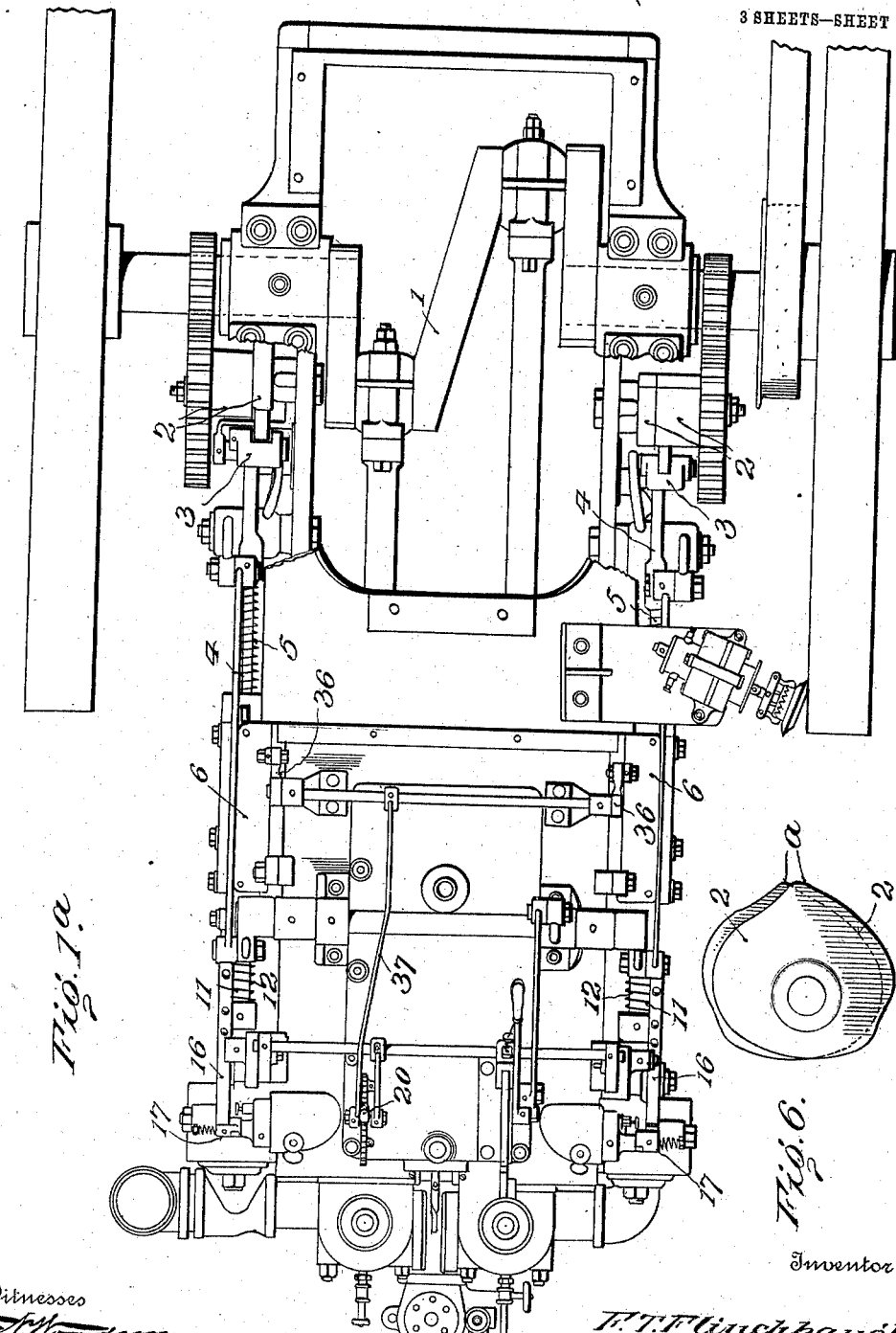

F. T. FLINCHBAUGH.
GOVERNOR MECHANISM FOR INTERNAL COMBUSTION ENGINES.
APPLICATION FILED NOV. 30, 1909.
966,896.
Patented Aug. 9, 1910.
3 SHEETS—SHEET 3.
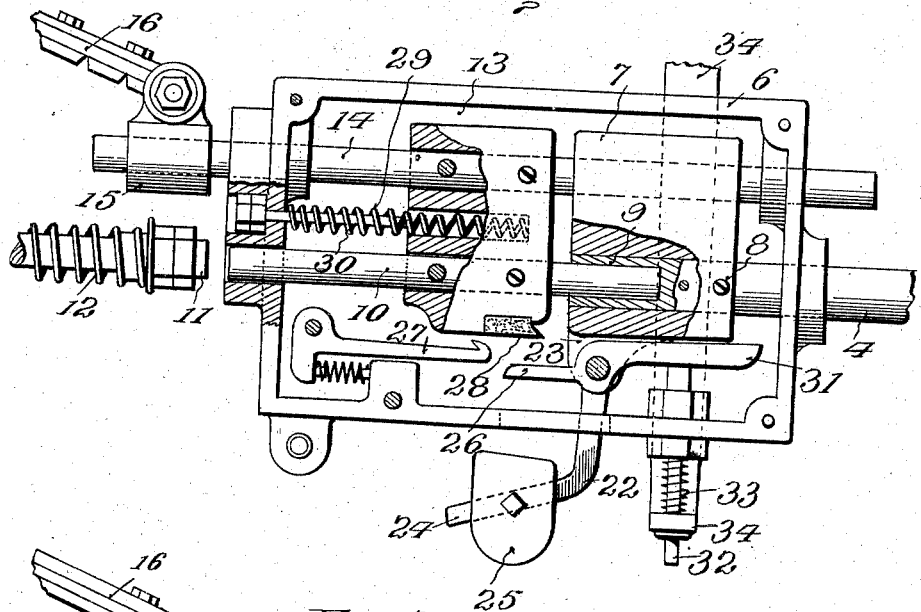
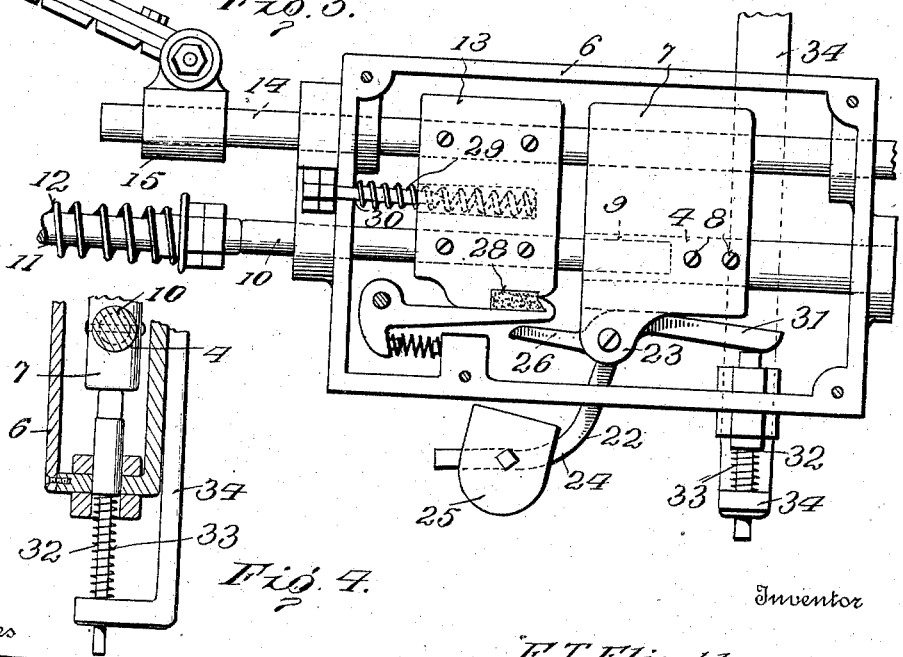

UNITED STATES PATENT OFFICE.

FREDERICK T. FLINCHBAUGH, OF YORK, PENNSYLVANIA.

GOVERNOR MECHANISM FOR INTERNAL-COMBUSTION ENGINES.

966,896.　　　　　　　Specification of Letters Patent.　　　Patented Aug. 9, 1910.

Application filed November 30, 1909.　Serial No. 530,622.

*To all whom it may concern:*

Be it known that I, FREDERICK T. FLINCHBAUGH, a citizen of the United States, residing at York, in the county of York and State of Pennsylvania, have invented certain new and useful Improvements in Governor Mechanism for Internal-Combustion Engines, of which the following is a specification.

This invention comprehends certain new and useful improvements in internal combustion engines of the hit and miss type, controlled by a governor mechanism which, when the engine exceeds a certain speed, holds the sparker in an inoperative condition and the exhaust valve open, until the excessive speed has been reduced.

The invention has for its primary object an improved construction of governor mechanism for engines of this character, which will be positive and efficient in its operation, composed of comparatively few parts that may be easily manufactured and readily assembled and not liable to get out of order, and which will be capable of adjustment at the will of the engine driver or operator, so as to come into play only when the speed of the engine reaches a predetermined point. And the invention also has for its object a governor mechanism of this character, the tension upon which is regulated by and concurrently with the advancement or retardation of the spark under the control of the spark advance lever.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of an internal combustion engine embodying the improvements of my invention; Fig. 1ᵃ is a top plan view thereof; Fig. 2 is a side elevation, on an enlarged scale, of the governor, parts being shown in section; Fig. 3 is a side elevation of substantially the same parts as shown in Fig. 2, but with the parts in different position; Fig. 4 is a transverse sectional view of a portion of the governor case; Fig. 5 is a detail side elevation of the circuit closing device; and, Fig. 6 is a face view of the cam employed.

Corresponding and like parts are referred to in the following description and indicated in all the views of the drawings by the same reference characters.

Referring to the drawings, the numeral 1 designates the drive shaft of an internal combustion engine of the four-cycle type, the same being arranged to drive cams 2 which are in turn designed to rock an arm 3 into engagement with a rod 4 which forms part of the improved governor mechanism. The operation of the cams 2, rocker arm 3 and parts for shifting the rocker arm from engagement with one cam into engagement with the other, does not form a part of the present invention, but is disclosed in and covered by a companion application for Letters Patent of the United States executed of even date herewith, relating to means for reversing the direction of rotation of the crank shaft. It is sufficient to say in the present case that the rocker arm 3 is interposed between the rod 4 and the cams and is actuated by either one cam or the other to move the rod 4 to the left or forwardly against the tension of its encircling spring 5, as the crank shaft 1 rotates.

Referring now particularly to Figs. 2 and 3, it will be seen that the forward end of the rod 4 projects into a box or casing 6 secured in any desired way to the side of the engine case or bed and provided with any suitable form of top or lid in order to inclose the interior parts, said lid being omitted from the illustration. A block 7 is formed with a longitudinal opening extending therethrough in which the forward end of the rod 4 is received, the block being secured to the rod, as by screws 8 or similar fastening devices. The forward end of the rod 4 is formed with a socket 9 in which one end of a stem 10 is mounted for a limited free movement of the stem relative to the rod, in a longitudinal direction, and the opposite or forward end of the stem 10 is mounted for bearing in one end wall of the casing 6 and is designed to be thrust out of the casing and into engagement with the exhaust valve stem 11 of the engine, so as to thrust said stem inwardly against the tension of its spring 12 and thereby open the exhaust port leading from the engine cylinder.

A plate 13 is secured in any desired way upon the stem 10 and is formed with a longitudinal bore in which a shaft 14 is held, the shaft 14 passing freely through a bore formed in the block 7 near the upper end of the latter and having bearing at its rear end in the adjacent end of the casing 6, as clearly illustrated in Figs. 2 and 3. The forward end of the shaft 14 projects out through a bearing formed in the opposite end of the casing 6 and has secured to it a sleeve 15 to which the contact bar 16 is pivotally and loosely connected. This contact bar is designed for engagement with a complemental contact member 17 so as to produce the spark and explode the compressed charge. The contact bar 16 is supported upon and movable over a roller 18 journaled in the lower end of a rocker 19, the position of which is controlled by the spark advancing and retarding lever 20, as indicated in Fig. 1. It is to be noted that the contact bar 16 is formed with an inclined edge 21, so that when the bar is moved forwardly it will ride upwardly on the roller 18 and if held at the forward limit of its movement will be out of engagement with the complemental contact member 17.

The block 7 carries a pendulum 22 which is pivotally suspended therefrom, being preferably mounted between depending ears 23 formed on the lower edge of the block, as shown. The pendulum 22 embodies a downwardly and forwardly projecting arm 24 on which a weight 25 is adjustably mounted. The pendulum also embodies a forwardly projecting finger 26 which is designed, under specified conditions, to engage a spring released latch 27 pivotally mounted in the casing 6, the latch being designed for engagement with a keeper block 28 secured to the lower edge of the plate 13 and preferably composed of hard steel. This keeper block 28 is preferably formed with a recessed rear end with which the hooked extremity of the latch 27 is intended to interlock.

29 designates an expansion spring which is mounted in one end of a socket formed in the plate 13 between the shaft 14 and stem 10, the other end of said spring being supported by a pin 30 secured in the adjacent end wall of the casing 6.

From as much of the description as has preceded, together with the accompanying drawings, particularly Figs. 2 and 3, it will be understood that as the rod 4 is pushed forwardly by the rocker arm 3, it will in turn thrust the stem 10 forwardly into engagement with the exhaust valve stem 11 to open the exhaust, and will also, through the instrumentality of the plate 13 and its connection with the stem 10 and shaft 14, move the contact bar 16 forwardly so as to produce a spark at the proper time. Such operations will be continued in succession so long as the engine does not exceed a predetermined speed. Should, however, an excessive speed be reached, it is to be understood that the rod 4 in its return or backward movement (to the right as viewed in the drawings), will cause the pendulum 22 to swing upwardly and forwardly so that the finger 26 thereof will contact with the latch 27 and push the same into engagement with the keeper block 28, it being, of course, understood that all of the moving parts are at the forward or left-hand limit of their movements at this time. This, of course, will hold the stem 10 pressed against the exhaust valve stem 11 so as to maintain the exhaust port open, and will also hold the shaft 14 in such position that the contact bar 16 will be raised out of the path of its complemental member 17, as best illustrated in Fig. 5, and the rod 4 and block 7 and the pendulum 22, will be permitted to reciprocate independently of any movement of the stem 10 and its concomitant parts, until the excessive momentum has expended itself and the speed restored to the predetermined normal point. At such time, the pendulum 22 will not have sufficient momentum to swing it up into engagement with the latch 27 and the spring of said latch will thereby disengage it from the keeper 28 and permit the stem 10 to move rearwardly with the rod 4, releasing the stem 11 of the exhaust valve and carrying the shaft 14 to the right, together with the contact bars 16, so as to move the latter to a position in which it will be prepared for a subsequent spark producing movement. This movement of the stem 10 and shaft 14 is materially assisted and quickened by the action of the spring 29 in the plate 13. It is, of course, evident that even after the keeper 28 has been engaged by the latch 27, as above set forth, the successive reciprocations of the rod 4 will, until the excessive speed has been reduced, cause the inner end of the socket 9 to engage with the rear end of the stem 10 and effect a slight movement of the stem which will tend to release the keeper 28 from the latch 27, but it is to be remembered that the pendulum 22 will swing upwardly in every instance and cause the latch to take a fresh hold upon the keeper 28 every time the rod 4 comes forward or to the left, thereby causing, to all practical intents and purposes, the latch 27 to be in continuous engagement with its keeper.

In order to vary the point or degree of speed at which the governor pendulum 22 shall come to play, I provide means for producing and varying a tension upon the rearwardly projecting arm 31 of the pendulum. In the present instance, this variable tensioning means includes a vertically disposed pin 32 which extends up through the lower or bottom wall of the casing 6 into engagement with the arm 31 and which is encircled by a spring 33, the lower end of which rests upon the lower end of an angular bracket 34. (See Figs. 2, 3 and 4.) The bracket 34 extends upwardly, as shown, and is connected at its upper end, (Fig. 1) to an extensible rod 35, said rod in turn being connected by a bell crank 36 to a link rod 37 extending to and connected with the spark advancing and retarding lever 20. It will thus be understood that the movement of said lever in a direction to advance the spark will be accompanied by an increase of the tension of the spring 33 upon the pin 32 and consequently also upon the pendulum 22. Conversely, a movement of the hand lever 20 in a direction to retard the spark, will lessen the tension of the spring 33 upon the pin 32. Thus the advance of the spark to accelerate the engine, will exert an increased tension upon the pendulum and the engine will have to reach a higher speed before the pendulum will swing up to effect the engagement of the latch 27 with the keeper 26, as before described.

While the cams 2, in one aspect of the case, are not essential to the successful operation of the governor mechanism, yet in another sense they are exceedingly important, and I refer particularly to the raised portion, or hump a. In this connection, it is of course evident that the pendulum will tend to rebound from the latch 27 upon the return movement of the rod 4, the pendulum thereby quickly releasing the latch and permitting the spring of said latch to exercise its tendency to release the latch from the keeper 28, this being particularly true owing to the fact that in every forward movement of the reciprocating rod 4, the inner end of the socket 9 will strike the rear end of the stem 10 and slightly release the keeper from the latch, as has been before stated. In order, then, to prevent the accidental release of the latch 27 from the keeper, each cam is formed with the raised portion a, the same permitting the block 13 and the stem 10 to which it is connected, to quickly follow up, or rather start to follow up, the reverse movement of the rod 4 so as to bring the keeper 28 into firm engagement with the latch 27, notwithstanding the rebound of the pendulum 22.

From the foregoing description in connection with the accompanying drawings, the operation of my improved internal combustion engine will be obvious. In the practical operation of the engine, the rotation of the cams 2 will rock the arm 3 and thereby effect, in connection with the spring 5, a reciprocation of the rod 4, so as to carry the stem 10 and shaft 14 forwardly to produce the spark and open the exhaust port of the engine cylinder at the required intervals. Should the engine reach an excessive speed, the pendulum 22 will be swung forwardly and upwardly upon the backward or reverse movement of the rod 4, and the latch 27 will be thereby caused to engage with the keeper 28 so as to maintain the plate 13, stem 10 and shaft 14 stationary at the forward limit of their movements, independent of any free movement of the rod 4 under the momentum of the fly wheels, the exhaust port being thereby held open and the charges being vented to the atmosphere and not admitted through the inlet valve, and the contact bar 16 being held raised and in an inoperative position, as illustrated in Fig. 5, so as to avoid the production of a spark. As soon as the speed has been reduced to the predetermined point by the expenditure of the momentum, the pendulum 22 will not engage the latch 27 and as the rod 4 then strikes the stem 10, the keeper 27 will be permitted to disengage from the keeper 28 and permit all of the parts to move rearwardly again so as to restore the normal cycles of the engine.

In addition to the points of advantage that have been before pointed out, it is to be also noted that owing to the adjustable connection 35 between the bracket 34 and the bell crank 36, my invention is peculiarly advantageous in connection with internal combustion engines of more than one cylinder. For instance, if it be supposed that the engine is a two or more cylinder engine, controlled by a single spark lever 20, said lever 20 may be arranged to actuate two or more bell crank levers 36, one for each cylinder, and consequently by extending one of the connections 35, or retracting or shortening the other, one of the cylinders may be held inoperative up to a certain speed or load and only brought in play when such predetermined speed or load has been exhausted. In the present case, a two-cylinder engine is illustrated, the parts being duplicated on opposite sides, as best illustrated in Fig. 1ª, this form clearly showing how the one spark lever 20 controls both of the tension carrying means for the two pendulums.

It is of course to be understood that the invention described and claimed, and one embodiment of which is illustrated in the accompanying drawings is adaptable to any type of engine, either stationary, portable, or automobile or marine engines as well as traction engines.

Having thus described the invention, what is claimed as new is:

1. In an internal combustion engine, the combination with the exhaust valve thereof, of a valve opening rod, a stem carried by the rod and arranged to be pushed forwardly thereby into engagement with the exhaust valve to open the same, a spark contact bar carried by said stem, means for automatically moving the contact bar to an inoperative position upon the forward movement thereof, and means governed by the speed of the engine for automatically holding the stem at substantially the forward limit of its movement in engagement with the exhaust valve and with the contact bar in an inoperative position, while permitting the rod to run free.

2. In an internal combustion engine, the combination with the exhaust valve thereof, of a valve opening rod, a stem carried by the rod and arranged to be pushed forwardly thereby into engagement with the exhaust valve to open the same, a spark contact bar carried by said stem, a roller over which the bar is adapted to move in the forward movement of the latter, into a raised inoperative position, means for shifting the position of the roller, and means governed by the speed of the engine for automatically holding the stem at substantially the forward limit of its movement in engagement with the exhaust valve and with the contact bar held at the forward limit of its movement, while permitting the rod to run free.

3. In an internal combustion engine, the combination with the exhaust valve thereof, of a valve opening rod, a stem carried by the rod and arranged to be pushed forwardly thereby into engagement with the exhaust valve to open the same, a spark contact bar carried by said stem and provided with an inclined surface, a roller over which the bar is adapted to move, the roller being arranged to engage said inclined surface to raise the contact bar to an inoperative position in the forward movement of said bar, a rocker arm carrying said roller, a hand lever having an operative connection with said rocker arm to move the same to shift the position of the roller, and means governed by the speed of the engine for automatically holding the stem at substantially the forward limit of its movement in engagement with the exhaust valve and with the contact bar at the forward limit of its movement, while permitting the rod to run free.

4. In an internal combustion engine, the combination with the exhaust valve thereof, of a valve opening rod, a stem movable independently of the rod and adapted to be pushed thereby into engagement with the exhaust valve to open the latter, a spark controlling lever, and governor mechanism arranged at a predetermined speed to hold the sparking mechanism inoperative and the stem in engagement with the exhaust valve to hold the same open, while permitting the rod to run free, and means controlled by said spark controlling lever for exerting a tension upon the governor mechanism.

5. In an internal combustion engine, the combination with the exhaust valve thereof, of a valve opening rod, means for actuating the same, a block secured upon the forward end of said rod, the rod being formed at its forward end with a forwardly facing socket, a stem mounted to move in said socket and arranged to be pushed by the rod into engagement with the exhaust valve to open the same, a plate carried by said stem, a shaft secured to said plate, a spark contact bar carried by said shaft, means for moving the said bar to an inoperative position in the forward movement of the bar, and means governed by the speed of the said rod for automatically holding the stem, plate and contact bar in a forward position, while permitting the rod to run free.

6. In an internal combustion engine of the two-cylinder type, including a spark controlling lever, and governor mechanism for each cylinder arranged at a predetermined speed to hold the sparking mechanism inoperative and the exhaust valves open, means for exerting a tension upon the governor mechanism whereby to hold the same inoperative until a predetermined speed has been reached, and an independent connection between said tensioning means for each governor mechanism and the spark controlling lever, one of said connections being adjustable whereby the tension upon one governor mechanism may be greater than the tension upon the other.

7. In an internal combustion engine, governor mechanism arranged to hold the sparking devices inoperative and the exhaust valve open, said means including a reciprocating rod and a pendulum carried thereby, said pendulum being provided with a rearwardly extending finger, a spring pressed pin arranged to engage said finger to retard the swinging movement of the pendulum, a bracket arranged to vary the tension of the spring, a spark controlling lever, and a connection between said bracket and said lever.

8. In an internal combustion engine, the combination with the exhaust valve thereof, of a valve opening rod, means for reciprocating said rod, the rod being formed at its forward end with a forwardly facing socket, a casing into which the forward end of the socket projects, a stem mounted to move in said socket and arranged to be pushed by the rod into engagement with the exhaust valve to open the same, a block secured to the forward end of the rod within the casing, a plate secured to said stem within the casing and formed with a keeper, a spring released latch adapted to engage said keeper in the forward position of the plate and stem, a shaft extending parallel with said stem and mounted to move in the casing through the block, said shaft being secured to said plate, a spark contact bar secured to the forward end of said shaft, a spring bearing upon said plate and tending to hold the same with the stem at the inner end of the socket in the rod, and a pendulum carried by said block and formed with a forwardly projecting finger adapted to engage the latch so as to swing it into engagement with the keeper.

9. In an internal combustion engine, the combination with the exhaust valve thereof, of a valve opening rod, a cam arranged to actuate the rod, a stem extending longitudinally from said rod and having a limited movement independent thereof and adapted to be pushed by the rod into engagement with the exhaust valve to open the same, the stem carrying a keeper, a spring released latch adapted to engage said keeper in the forward position of the stem, and a pendulum movable with the rod and adapted to swing into engagement with the latch whereby to move the same into engagement with the keeper, the rod actuating cam being formed with a raised portion, as and for the purpose set forth.

10. In an internal combustion engine including a spark controlling lever, governor mechanism arranged at a predetermined speed to automatically hold the sparking mechanism inoperative and the exhaust valve open, and means controlled by said spark controlling lever for exerting a varying tension upon the governor mechanism.

In testimony whereof I affix my signature in presence of two witnesses.

FREDERICK T. FLINCHBAUGH. [L. S.]

Witnesses:
PHILIP N. LEHN,
E. D. FLINCHBAUGH.